(12) United States Patent
Sun et al.

(10) Patent No.: US 10,034,356 B2
(45) Date of Patent: *Jul. 24, 2018

(54) SMART LIGHTING DEVICE, AND SMART LIGHTING CONTROL SYSTEM AND METHOD

(71) Applicant: SENGLED OPTOELECTRONICS CO., LTD., Tongxiang (CN)

(72) Inventors: Chaoqun Sun, Tongxiang (CN); Xia Wang, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/902,167

(22) PCT Filed: Apr. 23, 2015

(86) PCT No.: PCT/CN2015/077264
§ 371 (c)(1),
(2) Date: Dec. 30, 2015

(87) PCT Pub. No.: WO2016/045375
PCT Pub. Date: Mar. 31, 2016

(65) Prior Publication Data
US 2016/0227633 A1 Aug. 4, 2016

(30) Foreign Application Priority Data

Sep. 26, 2014 (CN) .......................... 2014 1 0504305

(51) Int. Cl.
*H05B 37/02* (2006.01)
(52) U.S. Cl.
CPC ..... *H05B 37/0272* (2013.01); *H05B 37/0227* (2013.01); *H05B 37/0236* (2013.01); *Y02B 20/48* (2013.01)

(58) Field of Classification Search
CPC ............ H05B 37/0227; H05B 37/0272; H05B 37/0236; H05B 33/0842; H05B 37/0218;
(Continued)

(56) References Cited

U.S. PATENT DOCUMENTS 5,412,738 A * 5/1995 Brunelli ............... A61B 5/1176
382/115
2009/0262189 A1 10/2009 Marman
(Continued)

FOREIGN PATENT DOCUMENTS

| CN | 201063914 Y | 5/2008 |
| CN | 102117062 A | 7/2011 |

(Continued)

OTHER PUBLICATIONS

The World Intellectual Property Organization (WIPO) International Search Report for PCT/CN2015/077264 dated Jul. 1, 2015.
(Continued)

*Primary Examiner* — Alexander H Taningco
*Assistant Examiner* — Renan Luque
(74) *Attorney, Agent, or Firm* — Anova Law Group, PLLC

(57) ABSTRACT

The present disclosure provides a smart lighting device, and a smart lighting control system and method. The smart lighting device includes a wireless communication module, a control module, an image acquisition module configured to collect images/videos near the smart lighting device in real-time and to send the images/videos to the control module for analysis, and a microphone module configured to have operation modes including a sleep mode and a monitor mode to receive a control signal from the control module to switch between the operation modes, and to collect audio signals in the surrounding area of the smart lighting device when operated at the monitor mode. The control module is
(Continued)

configured to receive and analyze the images/videos from the image acquisition module. When a human appearance is identified in the images, the control module sends the control signal to the microphone module to switch to the monitor mode.

18 Claims, 2 Drawing Sheets

(58) Field of Classification Search
CPC ............ H05B 37/0245; H05B 33/0803; H05B 37/0209; H05B 33/0854; H05B 37/02; H05B 37/029; Y02B 20/48; Y02B 20/383; Y02B 20/40; Y02B 20/44; Y02B 20/46; Y02B 20/19; Y02B 20/42; Y02B 20/445; Y02B 20/72; Y02B 60/34; Y02B 60/50; G06K 9/00302; G06K 9/00228; G10L 25/63; G10L 15/22; G10L 21/0208; G10L 25/84; G10L 17/24; G10L 15/08; G10L 2015/227; G10L 15/24; G10L 2015/223; G10L 15/26; G10L 2015/088; G10L 13/027; H04L 12/2803; G06F 3/00; G06F 3/01; G06F 3/167
See application file for complete search history.

(56) References Cited

U.S. PATENT DOCUMENTS

| | | | | |
|---|---|---|---|---|
| 2011/0074225 | A1* | 3/2011 | Delnoij | H05B 37/0227 307/117 |
| 2014/0354160 | A1* | 12/2014 | Aggarwal | H05B 37/0227 315/152 |
| 2016/0021448 | A1* | 1/2016 | Peng | H04R 3/00 381/150 |
| 2016/0105644 | A1* | 4/2016 | Smith | H04N 5/23206 348/159 |
| 2017/0004828 | A1* | 1/2017 | Lee | G06K 9/00302 |
| 2017/0265277 | A1* | 9/2017 | Nolan | H05B 37/0227 |

FOREIGN PATENT DOCUMENTS

| | | | |
|---|---|---|---|
| CN | 202870852 | U | 4/2013 |
| CN | 103177557 | A | 6/2013 |
| CN | 203458385 | U | 3/2014 |
| CN | 203851334 | U | 9/2014 |
| EP | 582989 | A2 | 2/1994 |
| KR | 10-2013-0130321 | A | 12/2013 |
| KR | 2014-0050837 | A | 4/2014 |
| KR | 20140077802 | A | 6/2014 |
| KR | 10-1436306 | B1 | 9/2014 |
| TW | 201330609 | A | 7/2013 |
| WO | 2013/110027 | A1 | 7/2013 |

OTHER PUBLICATIONS

European Patent Office (EPO) Extended Search Report for 15844863.9 dated May 2, 2018 9 Pages.

* cited by examiner

SMART LIGHTING DEVICE, AND SMART LIGHTING CONTROL SYSTEM AND METHOD

CROSS-REFERENCES TO RELATED APPLICATIONS

This application is a national phase entry under 35 USC § 371(c) of PCT Application No. PCT/CN2015/077264, filed on Apr. 23, 2015, which claims the priority of Chinese Patent Application No. CN201410504305.6, filed on Sep. 26, 2014, the entire content of all of which are incorporated herein by reference.

FIELD OF THE DISCLOSURE

The present disclosure generally relates to the field of lighting technologies and, more particularly, relates to a smart lighting device, a smart lighting control system, and a smart lighting control method.

BACKGROUND

Smart lighting devices often include a microphone unit configured to use voices to perform basic controls (such as on/off switching and brightness adjustments) of the lighting devices. However, existing smart lighting devices generally do not have wireless communication capabilities and cannot send collected audio signals to a smart terminal via Internet, which limits their applications in various situations.

On the other hand, even though some smart lighting devices may have wireless communication capabilities and voice recognition functions, the microphone may have to be operated in a monitoring mode all the time. This increases energy consumption of the device. In addition, oftentimes the collected audio signals are not useful and may occasionally cause false command recognition. Error messages and false actions may thus occur.

Therefore, it is desirable to provide a smart lighting device with a microphone having controllable operation modes so that the device could maintain a low level of energy consumption. The disclosed method, device, and system are directed to solve one or more problems set forth above and other problems in the art.

BRIEF SUMMARY OF THE DISCLOSURE

One aspect of the present disclosure provides a smart lighting device. The smart lighting device includes a light-emitting module configured to emit light, a power supply module configured to power the entire smart lighting device, and a wireless communication module configured to perform wireless communication. An image acquisition module is configured to capture an image or a video of a surrounding area of the smart lighting device in real-time, and to send the image or the video to the control module for analysis. A microphone module is configured to have operation modes including a sleep mode and a monitor mode, and configured to receive a control signal from the control module based on the image or the video to switch between the two operation modes. The microphone module is configured to collect audio signals in the surrounding area of the smart lighting device when operated at the monitor mode. The control module is configured to respectively connect the light-emitting module, the image acquisition module, the microphone module, and the wireless communication module, to receive and analyze the image or the video from the image acquisition module to provide the control signal based on the image or the video, and to send the control signal to the microphone module to switch to the monitor mode, when an appearance of a human or a specific human gesture in the images.

Another aspect of the present disclosure provides a smart lighting control system. The smart lighting control system includes a smart lighting device and a cloud server. The smart lighting device may include a light-emitting module configured to emit light, a power supply module configured to power the entire smart lighting device, an image acquisition module configured to capture an image or a video of a surrounding area of the smart lighting device in real-time, and to send the image or the video to a wireless communication module. The wireless communication module is configured to send the image or the video from the image acquisition module to the cloud server, and to perform wireless communications with an external device. A microphone module is configured to have operation modes including a sleep mode and a monitor mode, and configured to receive a control signal from a control module based on the image or the video to switch between the operation modes. The microphone module is configured to collect audio signals in the surrounding area of the smart lighting device when operated at the monitor mode. The control module is configured to send the control signal to the microphone module for switching between the operation modes. The wireless communication module sends the image or the video from the image acquisition module to the cloud server. The cloud server performs image recognition using recognition software. When the cloud server determines an appearance of a human or a specific human gesture is in the image or the video, the cloud server sends a feedback to the control module to switch the microphone module to the monitor mode.

Another aspect of the present disclosure provides a smart lighting control method by providing a smart lighting device including a power supply module, a light-emitting module, an image acquisition module, a microphone module configured to have operation modes including a sleep mode and a monitor mode, a wireless communication module, and a control module. An image or a video of a surrounding area of the smart lighting device is captured and sent to the control module for analysis. The microphone module is switched to the monitor mode when an appearance of a human or a specific human gesture is identified in the image or the video. Audio signals in the surrounding area of the smart lighting device are collected by the microphone module at the monitor mode and recognized by the control module of the smart lighting device locally or by a cloud server connected to the smart lighting device to generate a voice command. An on/off switch, brightness, color, color temperature, or their combinations of light emitted from the light-emitting module is adjusted according to the voice command.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, one of ordinary skill in the art may derive other embodiments consistent with the present disclosure, all of which are within the scope of the present invention.

Figure 1:
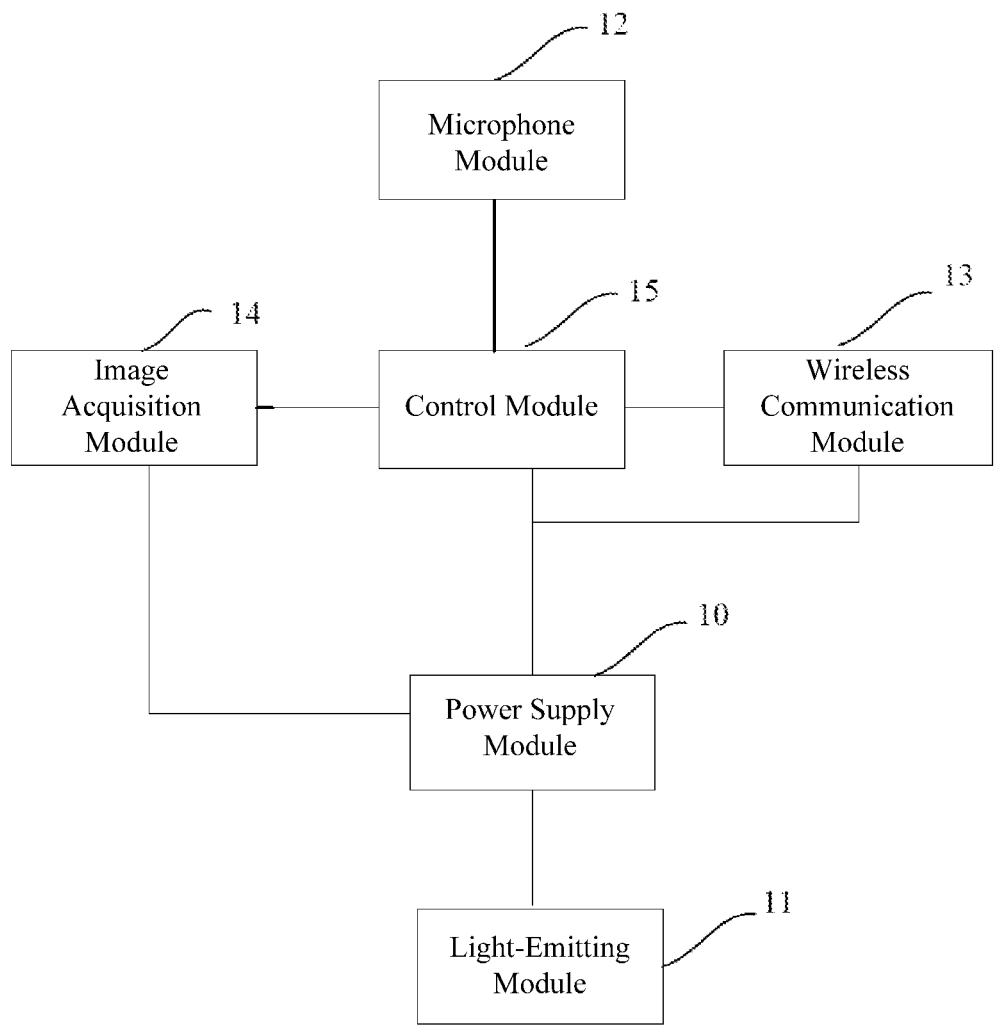
FIG. 1 is a schematic structure diagram of an exemplary smart lighting device consistent with various disclosed embodiments of the present disclosure.

FIG. 1 is a schematic structure diagram of an exemplary smart lighting device consistent with various disclosed embodiments of the present disclosure. As shown in FIG. 1, an exemplary smart lighting device may include a power supply module 10, a light-emitting module 11, a microphone module 12, a control module 15, a wireless communication module 13 and an image acquisition module 14.

The power supply module 10 may provide power to the entire smart lighting device, and drive the light-emitting module 11 to emit light. The microphone module 12, the control module 15, the wireless communication module 13 and the image acquisition module 14 may respectively connect to the power supply module 10. The microphone module 12 may be configured to have controllable or switchable operation modes, for example, including a sleep mode and a monitor mode.

The image acquisition module 14 may include an image sensor. The image sensor may be a CCD (charge-coupled device) image sensor or a CMOS (complementary metal-oxide semiconductor) image sensor. The image acquisition module 14 may be configured to capture images and/or videos of a surrounding area of the smart lighting device in real-time, and provide feedback to the control module 15.

The control module 15 may be configured to analyze the images/videos received from the image acquisition module 14 and determine whether a human/person/user or any object appears in the images. For example, when it is determined that a human shows up in the image provided by the image acquisition module 14, the control module 15 may send a control signal to the microphone module 12 and activate the microphone module 12 from a sleep mode to a monitor mode. When operating at a monitor mode, the microphone module 12 may be configured to collect audio signals near the smart lighting device, and to send the audio signals to the control module 15 and the wireless communication module 13.

In one embodiment, the microphone module 12 may switch between the sleep mode and the monitor mode by a built-in software program configured in the smart LED lighting device. For example, the built-in software program may be integrated and loaded into the control module 15 within the smart LED lighting device. In another embodiment, switching between the sleep mode and the monitor mode may be implemented by hardware such as an integrated circuit (IC) device.

Further, in various embodiments, as the image acquisition module 14 operates in real-time, when the control module 15 analyzes and determines that a human in the images/videos is disappeared for a preset duration, such as about 10 seconds or any preset time duration, the control module 15 may send a signal to switch the microphone module 12 to the sleep mode. In certain embodiments, a human near the smart lighting device may use a specific hand gesture or a voice command to switch the microphone module 12 to the sleep mode.

Optionally, the image acquisition module 14 may further include an image recognition unit. The microphone module 12 may be configured to be triggered or activated (e.g., switched to the monitor mode) when the acquisition module 14 detects an appearance of a human, a specific gesture performed by a human, or any object. For example, the specific gesture may be a body action in a pre-configured pattern, such as waving a hand clockwise for more than 90 degrees, and/or moving a hand, an elbow or a head from a distance towards the smart lighting device until it is blocking the view of the image sensor of the image acquisition module.

In certain embodiments, the image acquisition module 14 may not include the image recognition unit, but may send the captured images/videos to a cloud server (or a smart terminal such as a mobile phone). The cloud server may perform image recognition and determine to switch the microphone module to the monitor mode accordingly.

Further, the smart LED lighting device may include a microphone activation indicator to indicate whether the microphone is being operated at the monitor mode or not.

Figure 2:
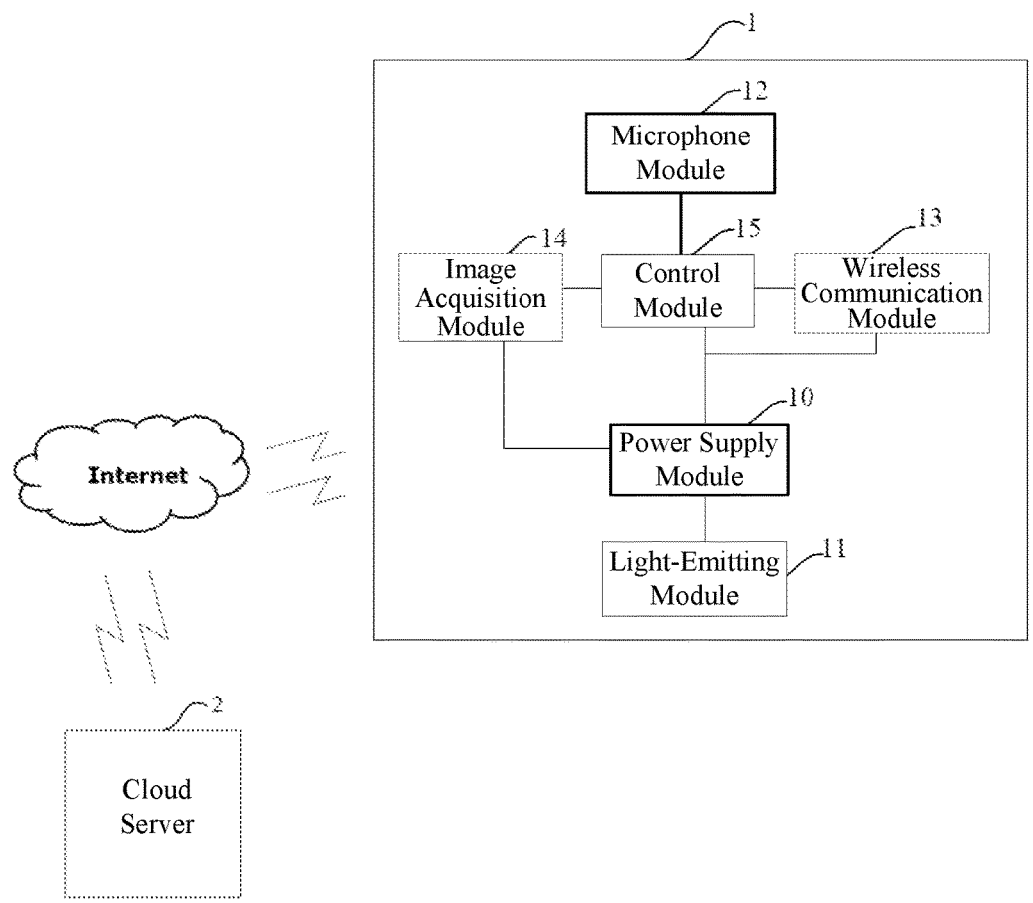
FIG. 2 is a schematic diagram of an exemplary application scenario of the smart lighting device consistent with various disclosed embodiments of the present disclosure.

FIG. 2 is a schematic diagram of an exemplary application scenario of the smart lighting device consistent with various embodiments of the present disclosure. As shown in FIG. 2, an exemplary smart lighting device 1 may connect to a cloud server 2 via a network. The smart lighting device 1 and the cloud server 2 may form a smart lighting control system. Note that the cloud server is used herein as an example for illustration purposes, any computing devices, such as a smart terminal, can be used to replace the cloud server.

When the image acquisition module 14 of the smart lighting device 1 and/or the cloud server 2 detects appearance of a user or an object surrounding the smart lighting device 1, the microphone module 12 may be activated to the monitor mode and begin to collect audio signals surrounding the smart lighting device 1.

In one embodiment, the control module 15 of the smart lighting device 1 may perform voice recognition on the collected audio signals. In another embodiment, the voice recognition may be implemented by a software program configured on the cloud server 2. After a voice command is recognized from the audio signals by the voice recognition, using the cloud server 2, the voice command may be converted (or otherwise be processed) by the control module 15 to adjust the on/off switch, brightness, color, and/or color temperature of the smart lighting device 1.

In various embodiments, the audio signals collected by the microphone module 12 may include any audio information such as a voice command, noises, and/or music sound from a human, an animal or any suitable objects. Accordingly, such audio signals may be recognized by either the control module 15 or the cloud server 2. When the audio signals are recognized to generate a voice command by the voice recognition, the voice command is further processed by the control module 15 to control and/or adjust the smart lighting device 1, e.g., to turn on/off and/or to adjust light emitted by another smart lighting device in a different room, to turn on/off or adjust volume of a speaker of any smart lighting device in the same device network, etc.

In certain embodiments, a device network may be formed to include multiple smart lighting devices and one or more of a server and a smart terminal. For example, a user or a human approaching one of the smart lighting devices may be detected and captured by the image acquisition module of one smart lighting device to turn on its microphone to collect audio signals of the user. The voice command generated by the cloud server 2 from the collected audio signals may then be used to control other different smart lighting devices in a same network through the cloud server 2. For example, the software program configured on the cloud server 2 may generate voice commands with respect to each of various different smart lighting devices and to allow centralized control of these smart lighting devices in the same network. In this case, audio signal collected by one smart lighting device may be used to control other smart lighting device(s) via the cloud server.

In other certain embodiments, a device network may be formed to include multiple smart lighting devices, which may not include a server (such as a cloud server) or a smart terminal. For example, a user or a human approaching one of the smart lighting devices may provide an audio signal recognized by the control module of the smart lighting device to provide a voice command to control other different smart lighting device(s), e.g., to turn on/off and/or to adjust light emitted by another smart lighting device in a different room, to turn on/off or adjust volume of a speaker of any smart lighting device in the same device network, etc.

In addition, the smart lighting device 1 may connect to the Internet, and a user may directly inquire online information by voice commands, such as inquiring weather information and traffic information. In one embodiment, the smart lighting device 1 may further include a built-in speaker or a wireless speaker configured to broadcast the inquired information. In another embodiment, the inquired information may be broadcasted by an external speaker in the same network. In various embodiments, the broadcasted information may be received and implemented by any desired smart lighting device(s) in a device network.

Further, the built-in speaker in one smart lighting device or the external speaker in a same network may broadcast feedback information according to the voice command and allow interactions between a user and the smart lighting device. For example, the feedback information may confirm the user's lighting control commands, such as confirming turning light off right away or after a certain period of time, changing light color to blue or other color, increasing/decreasing brightness, etc. In another example, the feedback information may request the user's further guidance or detailed instructions in various occasions, such as asking the time and location for the weather report, and/or asking a specific road name for the traffic information.

The wireless communication module 13 may be configured to perform wireless communication with the cloud server and/or other devices. In various embodiments, the wireless communication module 13 may be a radio frequency (RF) module, a WI-FI module, or a Bluetooth module.

In one embodiment, the wireless communication module 13 may be a radio frequency module which adopts 2.4G or 5G WI-FI technologies, or adopts 2.5G, 3G or 4G mobile wireless communication technologies.

The present disclosure also provides a smart lighting method using a smart lighting device. The smart lighting device may include a power supply module, a light-emitting module, an image acquisition module, a microphone module, a wireless communication module and a control module. An exemplary smart lighting method consistent with the present disclosure may include the following steps.

In step 1, the image acquisition module may capture images/videos of a surrounding area of the smart lighting device and send the images/videos to the control module for analysis. When the control module determines a user appearance, the microphone module is switched to the monitor mode.

In step 2, the microphone module operates at the monitor mode and collects audio signals in the surrounding area of the smart lighting device.

In step 3, the audio signals may be parsed by the smart lighting device locally or by a cloud server connected to the smart lighting device.

In step 4, when the audio signals are recognized to generate a voice command, the voice command may be processed by the control module to adjust the on/off switch, brightness, color, and/or color temperature of the smart lighting device according to the voice command. Other smart lighting devices in a same network may also be controlled according to the voice command through the cloud server (or other computing device).

In one embodiment, the smart lighting method may further include the following exemplary step: the image acquisition module collects images/videos in the surrounding area of the smart lighting device and sends the images/videos to the control module for analysis. When the control module determines a human or any other objects in the images/videos is disappeared for preset time duration (e.g., about 10 minutes), the control module sends a signal to switch the microphone module to the sleep mode.

In another embodiment, a human or user near the smart lighting device may use a specific gesture or a voice command to switch the microphone module to the sleep mode. The specific gesture may be a body action in a pre-configured pattern, such as waving a hand clockwise for more than 90 degrees, and/or moving a hand, an elbow or a head from a distance towards the smart lighting device until it is blocking the view of the image sensor of the image acquisition module.

In certain embodiments, in addition to the image recognition performed by the image acquisition module, the control module, and/or the cloud server, face recognition technologies may be applied to detect the appearance of specific human according to a pre-stored face library. That is, a user may store his/her face credentials in the face library together with preset configurations, such as preferences on brightness, color, and/or color temperature of the light, and/or a preset voice command to activate the preset configuration. When the face recognition program determines that the user appears and/or the user gives the preset voice command, the smart lighting device may adjust the light-emitting module accordingly, for example, by changing color/brightness of the emitted light and/or broadcasting certain information from the speaker.

In some embodiments, the control module may adjust the lighting of the light emitting module based on whether the images collected from the image acquisition module accurately indicate a user's commands. For example, if the smart lighting device detects human gestures that are similar or close to the human gestures defined for certain control commands (e.g., switching light on, switching light off, etc.) but the control system cannot identify the gestures in the collected image data, the smart lighting device's control module may make adjustment(s) to the lighting generated by the light emitting module. For example, the smart lighting device may adjust the orientation, brightness, color, etc., of the light so that the image acquisition module may acquire images of better quality. The smart lighting device may also similarly adjust the lighting provided by the light emitting module when the control module over-identifies (i.e., identifies a command gesture when there was none) human gestures defined for certain control commands. The user may observe the change in lighting and re-make a gesture to trigger a control command (e.g., to turn on the microphone).

Similarly, if the smart lighting device has difficulty performing face recognition functions to trigger the microphone module to switch on/off or change operational modes, the smart lighting device's control module may make adjustment(s) to the lighting generated by the light emitting module. For example, the smart lighting device may adjust the orientation, brightness, color, etc., of the light so that the image acquisition module may acquire images of better quality.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure provides a smart lighting device with a built-in microphone module and an image acquisition module. The microphone module may have two operation modes including a sleep mode and a monitor mode. Only when the image acquisition module detects appearance of a user or any object in a surrounding area of the smart lighting device, the microphone module of the smart lighting device is triggered, such that the microphone module is waken up and performs voice collection only when needed, and remains in the low power sleep mode when not needed. This reduces power consumption of the entire smart lighting device, saves power, and expands the operational duration of the smart lighting device.

Further, the microphone module may send collected audio signals through the wireless communication module to a cloud server/smart terminal, which enables intelligent monitoring. In addition, the smart lighting device, the smart terminal, and/or the cloud server may perform voice recognition on the audio signals. When a voice command is generated from the audio signals, the light-emitting module may be controlled to adjust the on/off switch, brightness, color, and/or color temperature of the smart lighting device according to the voice command. In certain embodiments, the voice command may include controlling other smart devices in a same network through the cloud server.

What is claimed is:
1. A smart lighting device, comprising:
a light-emitting module configured to emit light;
a power supply module configured to power the entire smart lighting device;
a wireless communication module configured to perform wireless communication;
an image acquisition module configured to capture an image or a video of a surrounding area of the smart lighting device in real-time, and to send the image or the video to a control module for analysis;
a microphone module configured to have operation modes including a sleep mode and a monitor mode, and configured to receive a first control signal from the control module to switch from the sleep mode to the monitor mode and receive a second control signal from the control module to switch from the monitor mode to the sleep mode, wherein the microphone module is configured to: begin collecting audio signals in the surrounding area of the smart lighting device only when being activated at the monitor mode;
the control module, configured to respectively connect the light-emitting module, the image acquisition module, the microphone module, and the wireless communication module, based on receiving and analyzing the image or the video from the image acquisition module, to provide the first control signal to the microphone module to switch the microphone module from the sleep mode to the monitor mode only when detecting an appearance of a human or a first specific human gesture, and to provide the second control signal to the microphone module to switch the microphone module from the monitor mode to the sleep mode when detecting one of a second specific human gesture, and a first voice command; and
a face library configured to store face credentials with corresponding preset configurations, the corresponding preset configurations including user preferences on at least one of brightness, color, or color temperature of the emitted light, wherein when detecting the appearance of a user that matches one of the face credentials, the light emitting module adjusts the emitted light based on the corresponding preset configurations.

2. The smart lighting device according to claim 1, wherein the control module is further configured to perform voice recognition on the audio signals from the microphone module to generate a second voice command to control the light-emitting module to adjust an emitted light according to the second voice command.

3. The smart lighting device according to claim 1, wherein:
the image acquisition module is further configured to include an image sensor, and
the image sensor is a charge-coupled device (CCD) image sensor or a complementary metal-oxide semiconductor (CMOS) image sensor.

4. The smart lighting device according to claim 1, further comprising: a microphone activation indicator configured to indicate whether the microphone module is triggered to be at the monitor mode.

5. The smart lighting device according to claim 1, wherein:
the wireless communication module is a radio frequency (RF) module, a WI-FI module, or a Bluetooth module, and
when the wireless communication module is the RF module, the wireless communication module is configured to adopt 2.5G, 3G, or 4G mobile wireless communication.

6. The smart lighting device according to claim 3, wherein:

the image acquisition module further includes an image recognition unit configured to analyze and recognize the image or the video captured by the image acquisition module, and when a second specific human gesture is identified in the image or the video, the image recognition unit sends a feedback to the control module to send the first control signal to the microphone module to switch to the monitor mode.

7. A smart lighting control system, comprises:

a cloud server; and a smart lighting device including:

a light-emitting module configured to emit light;

a power supply module configured to power the entire smart lighting device;

an image acquisition module configured to capture an image or a video of a surrounding area of the smart lighting device in real-time, and to send the image or the video to a wireless communication module;

the wireless communication module configured to send the image or the video from the image acquisition module to the cloud server, and to perform wireless communications with an external device;

a microphone module configured to have operation modes including a sleep mode and a monitor mode, and based on receiving and analyzing the image or the video from the image acquisition module, configured to receive a first control signal from a control module to switch from the sleep mode to the monitor mode and receive a second control signal from the control module to switch from the monitor mode to the sleep mode, wherein the microphone module is configured to: begin collecting audio signals in the surrounding area of the smart lighting device only when being activated at the monitor mode; and the control module, configured to provide the first control signal to the microphone module to switch the microphone module from the sleep mode to the monitor mode, and provide the second control signal to the microphone module to switch the microphone module from the monitor mode to the sleep mode, wherein:

the wireless communication module sends the image or the video from the image acquisition module to the cloud server, the cloud server performs image recognition having a recognition software, only when the cloud server determines an appearance of a human or a first specific human gesture is in the image or the video, the cloud server sends a first feedback to the control module so that the control module provides the first control signal to switch the microphone module from the sleep mode to the monitor mode; and when the cloud server determines one of a second specific human gesture, and a first voice command, the cloud server sends a second feedback to the control module so that the control module provides the second control signal to switch the microphone module from the monitor mode to the sleep mode, and the cloud server is further configured to control another smart lighting device in a same network as the smart lighting device based on the audio signals collected by the microphone module.

8. The smart lighting control system according to claim 7, wherein the cloud server is further configured to:

parse the audio signals from the microphone module, and when a second voice command is recognized from the audio signals by the server, send the second voice command to the control module for controlling the light-emitting module to adjust emitted light according to the second voice command.

9. A smart lighting control method, comprising:

providing a smart lighting device including a power supply module, a light-emitting module, an image acquisition module, a microphone module configured to have operation modes including a sleep mode and a monitor mode, a wireless communication module, and a control module;

capturing an image or a video of a surrounding area of the smart lighting device and sending the image or the video to the control module for analysis;

based on receiving and analyzing the image or the video from the image acquisition module, switching the microphone module to the monitor mode, only when an appearance of a human or a first specific human gesture is identified in the image or the video, and switching the microphone module to the sleeping mode, when one of a second specific human gesture, and a first voice command is detected in the image or the video;

beginning collecting audio signals in the surrounding area of the smart lighting device by the microphone module only when the microphone module is activated to the monitor mode in response to the appearance of the human or the first specific human gesture being identified;

recognizing the audio signals by the control module of the smart lighting device locally or by a cloud server connected to the smart lighting device to generate a second voice command; and adjusting an on/off switch, brightness, color, color temperature, or their combinations of light emitted from the light-emitting module according to the second voice command, wherein the method further comprises:

configuring a face library to store face credentials with corresponding preset configurations, the corresponding preset configurations including user preferences on at least one of brightness, color, or color temperature of the emitted light; and when detecting the appearance of a user that matches one of the face credentials, adjusting the emitted light based on the corresponding preset configurations.

10. The method according to claim 9, further comprising:

configuring one or more smart lighting devices in a same network, and controlling a second smart lighting device by the second voice command through the cloud server connected to the smart lighting device.

11. The method according to claim 9, wherein:

the image acquisition module is further configured to include an image sensor, and the image sensor is a CCD image sensor or a CMOS image sensor.

12. The method according to claim 9, wherein:

the image acquisition module further includes an image recognition unit configured to analyze and recognize the image or the video captured by the image acquisition module, and when the appearance of the human or the first specific human gesture is identified in the image or the video, the image recognition unit sends a first feedback to the control module to switch the microphone module to the monitor mode, and when one of the second specific human gesture, and the first voice command is detected in the image or the video, the image recognition unit sends a second feedback to the control unit to switch the microphone module to the sleeping mode.

13. The method according to claim 9, wherein:
the image acquisition module sends the image or the video through the wireless communication to the cloud server, and
when the appearance of the human or the first specific human gesture is identified in the image or the video, the cloud server sends a first feedback to the control module to switch the microphone module to the monitor mode, and when one of the second specific human gesture, and the first voice command is detected in the image or the video, the cloud server sends a second feedback to the control unit to switch the microphone module to the sleeping mode.

14. The method according to claim 9, further comprising:
connecting the smart lighting device to the Internet through the wireless communication module, and
inquiring online information according to the second voice command by the microphone module, wherein the online information is weather information or traffic information.

15. The method according to claim 14, further comprising:
providing a built-in speaker in the smart lighting device, and
broadcasting the online information by the built-in speaker.

16. The method according to claim 14, further comprising:
connecting an external speaker to a same network as the smart lighting device, and
broadcasting the online information by the external speaker.

17. The smart lighting device according to claim 1, wherein:
the control module is further configured to adjust the light emitted by the light emitting module by adjusting at least one of orientation, brightness, or color of the light.

18. The smart lighting device according to claim 17, wherein:
the control module is configured to adjust the emitted light from the light emitting module when the control module cannot identify a gesture based on the image or the video from the image acquisition module.

* * * * *